May 3, 1927.

B. K. COX 1,627,317

COMBINED BUMPER AND JACK

Filed Oct. 5, 1926

Inventor
B. K. Cox
His Attorney

May 3, 1927.
B. K. COX
1,627,317
COMBINED BUMPER AND JACK
Filed Oct. 5, 1926
2 Sheets-Sheet 2
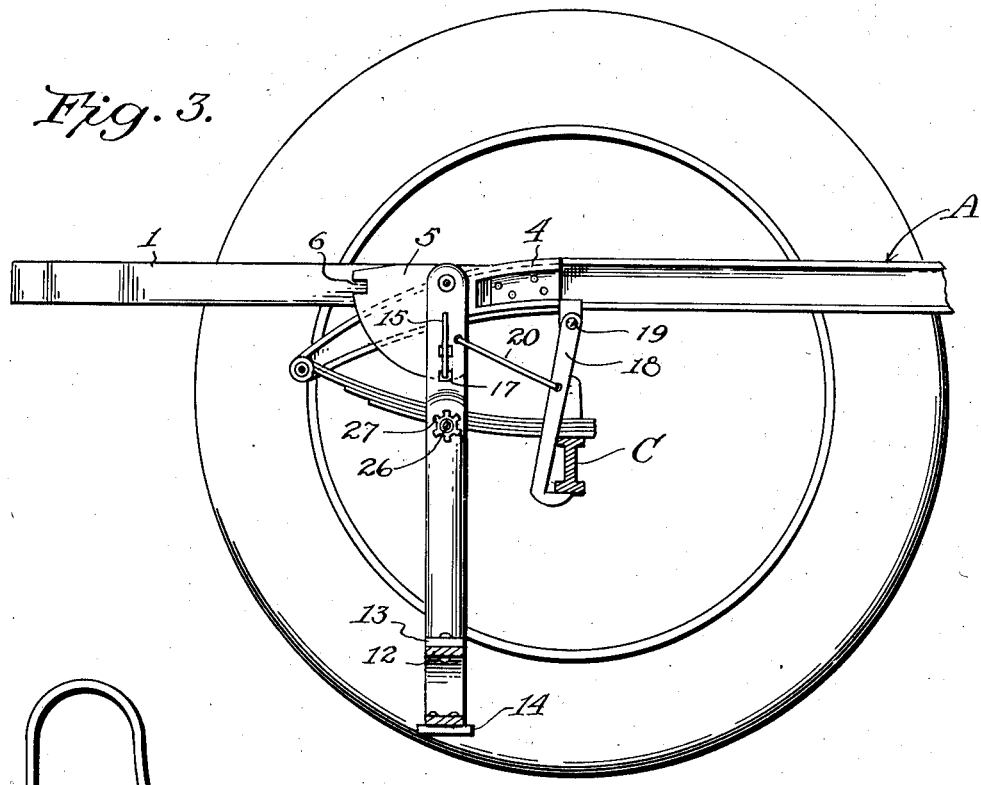
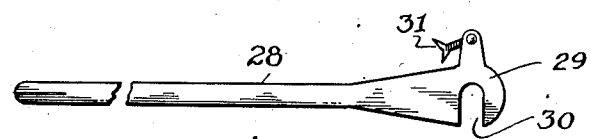
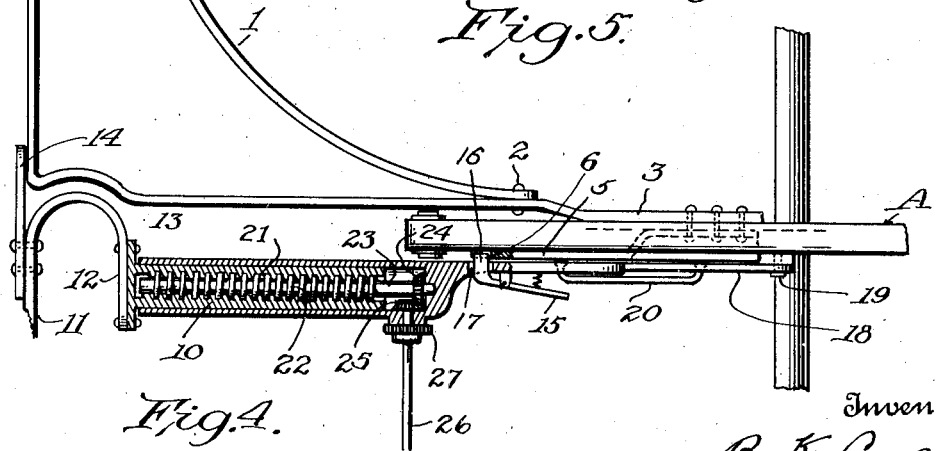

Patented May 3, 1927.

1,627,317

UNITED STATES PATENT OFFICE.

BURTON K. COX, OF JACKSONVILLE, FLORIDA.

COMBINED BUMPER AND JACK.

Application filed October 5, 1926. Serial No. 139,661.

The invention relates to attachments or accessories for use in connection with motor vehicles.

The principal object of the invention, generally stated, is to provide a combined vehicle bumper and jack, or in other words a structure which normally acts as a bumper but which is capable of being swung down for operation as a jack whenever it is desired to elevate the wheels as for instance when repairing tires or in fact for performing various other operations.

An important object of the invention is to provide a device of this character provided with means automatically engaging beneath the axle when the device is swung into position for use as a jack, the axle engaging element operating to prevent relative movement of the frame and axles.

Another object of the invention is to provide a combined device of this character provided with positively acting latch means for holding it in either selected position so that slipping or accidental movement will be prevented.

A further object of the invention is to provide a device of this type having very simple operable means for effecting the necessary movement to accomplish the jacking action, the arrangement of parts being such that ready access may be had to the operating means so that the device will be far more convenient to use than the ordinary type of jack.

Still another object is to provide a bumper of this character in which portions are fixed with respect to the frame of the vehicle so as to remain always in horizontal or normal position, only a portion of the bumper being movable downwardly to act as a jack.

An additional object of the invention is the provision of a combined bumper and jack which will be simple and inexpensive to manufacture, easy to apply and use, positive in action, efficient and durable in service, and a general improvement in the art.

With the above and other objects and advantages in view, the invention preferably consists in the arrangement and combination of parts and detailed structural features to be hereinafter more fully described and claimed, and illustrated in the accompanying drawings in which:

Figure 3 is a view similar to Figure 2 but showing the device swung down into position to act as a jack, Figure 4 is a fragmentary plan view partly broken away and in section to illustrate the jack construction more clearly, and Figure 5 is a detail view of the operating handle showing it in active position.

Figure 1:
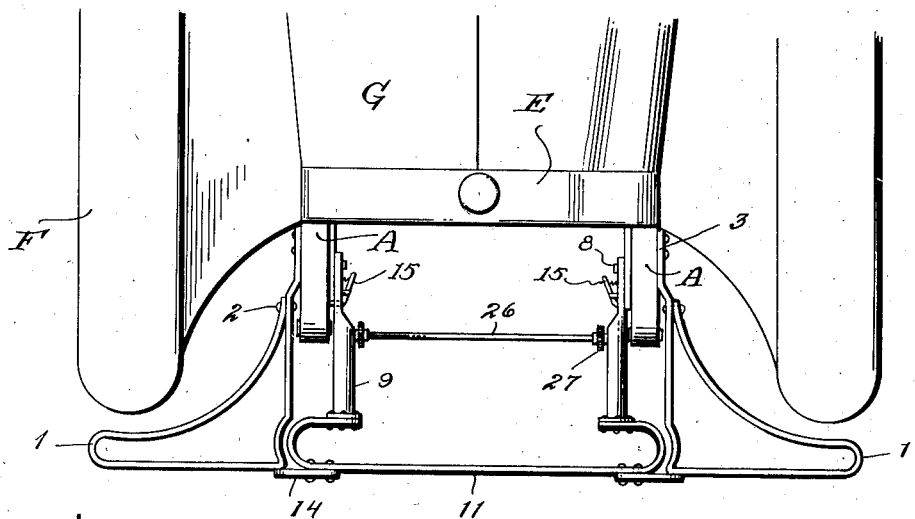
Figure 1 is a plan view of the forward portion of an automobile equipped with the invention, the parts being arranged to act as a bumper.

Referring more particularly to the drawings the letter A designates the frame bars forming part of the chassis of a motor vehicle, these frame bars being supported upon the axles by means of springs B as is the general practice. Only the front axle C is illustrated as the construction is approximately the same at the rear as well as at the front. The letter D designates the wheels, E the radiator, F the fenders and G the hood.

In carrying out the invention I provide bumper sections 1 which are rigidly attached to the frame bars A and which remain always in horizontal position. While it is conceivable that these sections 1, which act as lateral wings, may be of any perferred construction, they are here represented as being each formed as a single strip of spring steel bent into substantially triangular shape, the ends being connected at 2 and one end being extended beyond the point 2 to define an attaching portion 3 which is suitably secured to the frame bar. The construction is the same at both sides.

Secured in any preferred manner upon the forward portions of the frame bars A and at the inner or confronting faces thereof are bracket members 4 each of which terminates at its forward end in a preferably segmental plate 5 formed at its edge with notches 6 and 7 constituting retaining means for the latch mechanism to be described. Pivoted at 8 upon the brackets 4 are arms 9 which are of hollow formation throughout the major portion of their length. Slidably mounted in these hollow arms are posts 10 which carry a central or intermediate bumper section 11 which bridges the space between the outer sections or wings 1 when in normal or horizontal position. In the present instance this central section is disclosed as formed from a single strip of spring steel having reversely extended end portions 12 to which are secured attaching portions 13 on the posts 10. The intermediate section 11 is shown as equipped with plates 14 which bridge the joints between the section 11 and the sections 1.

Figure 2:
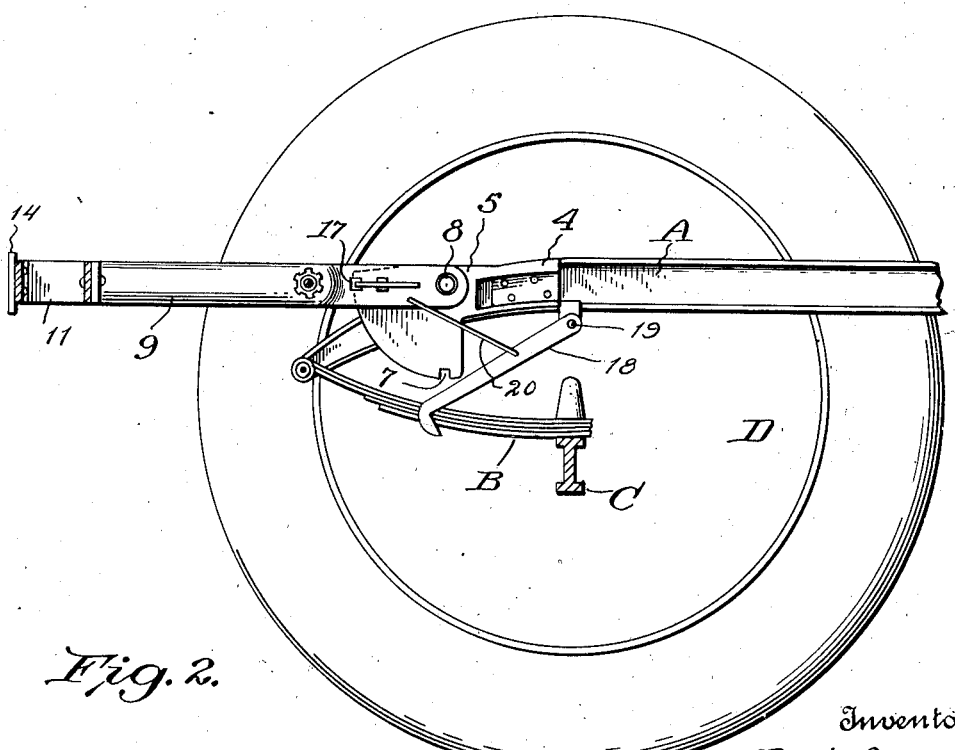
Figure 2 is a vertical cross sectional view with the parts arranged in the same position.

The central section 11 is swingable vertically from the position shown in Figures 1, 2 and 4 into that illustrated in Figure 3, and vice versa and in order to maintain it in either selected position, I provide a spring pressed pivoted latch 15 on each member 9 near the pivot 8, the latch having an angular end portion 16 passing through an opening 17 in the arm 9 for engagement within the notch 6 or 7, as the case may be.

It is of course necessary to provide means for holding the frame against movement with respect to the axle when the device is used as a jack. To accomplish this feature I provide a hook 18 pivoted at 19 upon each bracket 4 and adapted to engage beneath the axle C, these hooks being connected with the arms 9 by suitable links 20 so as to move simultaneously with the arms from operative to inoperative position or vice versa.

Each post 10 is formed with a threaded bore 21 within which is engaged a screw 22 formed on a shaft 23 suitably journaled in the hollow arm. Both shafts 23 carry bevel gears 24 with which mesh bevel gears 25 on the ends of a shaft 26 which extends between both arms 9 and which is suitably journaled therein.

The means for effecting rotation of the shaft 26 to drive the jack screws may conveniently comprise ratchets 27 carried by the shaft 26 and adapted to be rotated as by means of the wrench device illustrated in Figure 5, this device including a handle 28 carrying a head 29 slotted at 30 for engagement upon the shaft 26, the head carrying a pivoted pawl 31 engageable with either of the ratchets 27. Only one ratchet is necessary but two are shown as one might happen to be more convenient than the other.

In the operation of the device it will be understood that when it is to be used as a bumper the movable central section 11 and the arms 9 carrying the same will be located in horizontal position in alinement with and between the side sections 1. The latches 15 are, at this time, engaged within the notches 6 and the hooks 18 are in forwardly swung position out of engagement with the axle. With the parts thus arranged the device will act exactly like any other bumper inasmuch as it will protect the vehicle in a well known manner.

Whenever it is desired to jack up the wheels, the first thing necessary is to release the latches 15 from engagement with the notches 6. The arms 9 carrying the central section of the bumper may then swing downwardly upon the pivots 8. The operator then engages the latches 15 within the notches 7 so that the arms 9 will be held firmly in vertical position. The operator then engages the wrench upon the shaft 26 with the pawl 31 in cooperative relation to either of the ratchets 27. The wrench is then turned to effect rotation of the shaft 26 and as this shaft is geared to both shafts 23, the screws 22 operating within the threaded bores 21 will act to project the posts 10 and bumper section 11. The first part of the movement will bring the bumper section into engagement with the ground, floor or other surface on which the vehicle is resting and continued movement will cause the end of the vehicle to be lifted. When the arms 9 are initially swung downwardly the link members 20 connected therewith and with the hooks 18 will move the latter into engagement beneath the axle so that there can be no relative movement of the frame and axle. When the work to be done has been completed, the vehicle is let down by operating the wrench in the opposite direction so that the posts 10 will be retracted within the hollow arms 9.

From the foregoing description and a study of the drawings it will be apparent that I have thus provided a simply constructed, inexpensive and easily operated combined jack and bumper. By having the two functions combined in the one device it is evident that the equipment necessary for a vehicle is reduced. Furthermore, the device acts as a jack much more conveniently than the ordinary type of jack which has to be inserted in place beneath an axle, an act which is sometimes accompanied by considerable difficulty. It is really believed that the construction, operation and advantages will be readily apparent to one skilled in the art without further explanation.

While I have shown and described the preferred embodiment of the invention and have illustrated it as applied to the front of a vehicle it should be understood that the equipment is the same at the rear with the possible exception of the shape of the hooks which engage the axle. These, together with all other changes and modifications necessary to effect installation upon vehicles of different makes and styles are well within the scope of the invention and the right is reserved to make all such variations as will constitute no departure from the spirit of the invention or the scope of the claims hereunto appended.

Having thus described the invention, I claim:

1. A combined bumper and jack for vehicles, comprising arm members pivotally mounted on the vehicle frame and swingable from vertical to horizontal position, a bumper bar, posts carried by the bumper bar and slidable with respect to said arms, and means for moving said posts longitudinally.

2. A combined bumper and jack device for vehicles, comprising stationary bumper sections secured to the vehicle frame, an intermediate bumper section located between said sections and vertically swingably mounted on the vehicle frame, and a jack structure embodied in said intermediate section.

3. A combined bumper and jack device for vehicles, comprising bumper sections secured to the vehicle frame bars and projecting laterally therebeyond in advance of the wheels, an intermediate section bridging said first named sections and including supporting arms pivotally mounted on the vehicle frame bars for vertical swinging movement, a jack structure embodied in said intermediate section, and means for holding said intermediate section in either horizontal or depending vertical position.

4. A combined bumper and jack device for vehicles, comprising bumper sections secured to the vehicle frame bars and projecting laterally therebeyond in advance of the wheels, an intermediate section bridging said first named sections and including supporting arms pivotally mounted on the vehicle frame bars for vertical swinging movement, a jack structure embodied in said intermediate section, means for holding said intermediate section in either horizontal or depending vertical position, said means comprising latch members carried by said arms, and keeper elements carried by the frame bars for cooperation with the latch elements.

5. A combined bumper and jack device for vehicles, comprising bumpers sections secured to the vehicle frame bars and projecting laterally therebeyond in advance of the wheels, an intermediate section bridging said first named sections and including supporting arms pivotally mounted on the vehicle frame bars for vertical swinging movement, a jack structure embodied in said intermediate section, means for holding said intermediate section in either horizontal or depending vertical position, said means comprising pivoted spring pressed latch members carried by the arms and notched keeper plates carried by the frame bars and engageable by the latch members.

6. A combined bumper and jack device for vehicles, comprising bumper sections secured to the vehicle frame bars and projecting laterally therebeyond in advance of the wheels, an intermediate section bridging said first named sections and including supporting arms pivotally mounted on the vehicle frame bars for vertical swinging movement, a jack structure embodied in said intermediate section, means for holding said intermediate section in either horizontal or depending vertical position, said means comprising brackets secured on the frame bars and terminating in segmental plate portions having notches therein and latches movably mounted on the arms and engageable within selected notches.

7. In a combined bumper and jack device for vehicles, arms pivoted on the vehicle frame, posts slidably mounted within said arms, a bumper bar carried by said posts, said arms being vertically swingable to bring the bumper bar selectively in elevated position in advance of the vehicle or in lowered position adjacent the ground, and means for moving said posts.

8. In a combined bumper and jack device for vehicles, arms pivoted on the vehicle frame, posts slidably mounted within said arms, a bumper bar carried by said posts, said arms being vertically swingable to bring the bumper bar selectively in elevated position in advance of the vehicle or in lowered position adjacent the ground, means for moving said posts comprising screws journaled in the arms and threaded through the posts, and means for turning the screws.

9. In a combined bumper and jack device for vehicles, arms pivoted on the vehicle frame, posts slidably mounted within said arms, a bumper bar carried by said posts, said arms being vertically swingable to bring the bumper bar selectively in elevated position in advance of the vehicle or in lowered position adjacent the ground, means for moving said posts comprising screws journaled in the arms and threaded through the posts, and means for turning the screws simultaneously.

10. In a combined bumper and jack device for vehicles, arms pivoted upon the vehicle frame bars, screw actuated members slidably mounted along said arms, a bumper bar carried by said members, the arms being swingable to extend selectively in horizontal position or in depending vertical position, and means for connecting the arms with the vehicle axle when in vertical position.

11. In a combined bumper and jack device for vehicles, arms pivoted upon the vehicle frame bars, screw actuated members slidably mounted along said arms, a bumper bar carried by said members, the arms being swingable to extend selectively in horizontal position or in depending vertical position, means for connecting the arms with the vehicle axle when in vertical position comprising pivoted hooks, and operative connections between the hooks and the arms.

12. In a combined bumper and jack device for vehicles, bracket members mounted upon the vehicle frame, arms pivoted upon the bracket members and of hollow formation, posts slidable within said arms and formed with threaded bores, a bumper bar carried by said posts, screws engaged within said threaded bores and mounted for longitudinal movement within the arms, a shaft extending across both arms and geared to said screws, and means for rotating the shaft, said arms being swingable selectively to extend in horizontal or in depending vertical position.

13. In a bumper device of the character described, rigidly mounted bumper sections adapted to be secured to the frame bars of a vehicle and to extend laterally therebeyond, an intermediate bumper section pivotally mounted upon the frame bars and bridging the space between said first named sections when in normal position, and plate elements carried by said intermediate section and overlapping the joints between the same and the first named sections.

14. A device of the character described comprising bumper sections adapted to be secured upon the outer sides of the frame bars of a vehicle, brackets adapted to be secured upon the inner side of the frame bars, an intermediate bumper section embodying a jack structure and pivoted upon said brackets, said intermediate section being swingable to extend selectively in horizontal or depending vertical position, and means cooperating with the intermediate section and the brackets for maintaining the former in selected position.

15. A combined bumper and jack for vehicles comprising a bumper structure adapted to be mounted at the end of a vehicle frame for vertical swinging movement longitudinally of the vehicle, means normally holding the bumper structure in substantially horizontal position, and a jack device embodied in the bumper structure.

16. In a combined bumper and jack for vehicles, a bumper structure pivotally mounted at opposite sides of a vehicle frame for vertical swinging movement longitudinally of the vehicle frame, a jack device carried by the bumper structure and operable when the bumper structure is in depending vertical position, and means for holding the bumper structure in substantially horizontal position.

17. A combined bumper and jack for vehicles comprising a normally horizontal bumper structure swingable forwardly and downwardly to a position near the ground, and a jack device carried by the bumper structure.

18. In a device of the character described, a bumper structure having an immovable portion and a portion swingable forwardly and downwardly into a position near the ground, and a jack device carried by said swingable portion.

19. In a device of the character described, a pivoted bumper structure, means normally maintaining the same in operative substantially horizontal position to constitute a bumper, the bumper being swingable longitudinally of the vehicle, and means embodied in and forming a permanent part of the bumper structure and adapted to engage the ground to serve as a jack.

20. In a device of the character described, a bumper structure mounted upon the end of a vehicle frame for vertical swinging movement longitudinally thereof, a jack device embodied in and forming a permanent part of the bumper structure, means for throwing the jack device into operative position, and means pivotally connected with the bumper and automatically engageable with the vehicle axle when the bumper is swung into jacking position.

In testimony whereof I affix my signature.

BURTON K. COX.